(12) United States Patent
Peana et al.

(10) Patent No.: US 12,585,312 B2
(45) Date of Patent: Mar. 24, 2026

(54) META-OPTICS CAMERA ASSEMBLY FOR USE WITH INFORMATION HANDLING SYSTEMS

(71) Applicant: Dell Products L.P., Round Rock, TX (US)

(72) Inventors: Stefan Peana, Austin, TX (US); Christopher A. Torres, San Marcos, TX (US); Steven E. Davis, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 362 days.

(21) Appl. No.: 18/216,689

(22) Filed: Jun. 30, 2023

(65) Prior Publication Data

US 2025/0004509 A1    Jan. 2, 2025

(51) Int. Cl.
*G06F 1/16* (2006.01)
*G02B 1/00* (2006.01)

(52) U.S. Cl.
CPC ........... *G06F 1/1686* (2013.01); *G02B 1/002* (2013.01); *G06F 1/1616* (2013.01)

(58) Field of Classification Search
None
See application file for complete search history.

(56) References Cited

U.S. PATENT DOCUMENTS

| | | | | |
|---|---|---|---|---|
| 10,403,668 B2 * | 9/2019 | Arbabi | ............... | H10F 39/8023 |
| 11,184,546 B2 * | 11/2021 | Cho | ..................... | H10F 39/806 |
| 11,206,978 B2 * | 12/2021 | Hu | ........................... | A61B 3/12 |
| 2021/0028215 A1 * | 1/2021 | Devlin | .............. | G02B 27/4294 |
| 2021/0360154 A1 * | 11/2021 | Slobodin | ............... | H04N 23/90 |
| 2023/0103982 A1 * | 4/2023 | Song | ................... | G02B 6/1221 |
| | | | | 359/356 |
| 2023/0262307 A1 * | 8/2023 | Zhan | ................. | G02B 13/0015 |
| | | | | 348/335 |
| 2024/0418907 A1 * | 12/2024 | Hu | ...................... | G02B 5/1809 |

* cited by examiner

*Primary Examiner* — Rodney E Fuller
(74) *Attorney, Agent, or Firm* — Terrile, Cannatti & Chambers, LLP; Stephen A. Terrile

(57) ABSTRACT

A camera for use with an information handling system. The camera includes a meta-optics portion; a sensor, and, an interposer layer positioned between the meta-optics portion and the sensor portion, the interposer layer being parallelly aligned between the meta-optics portion and the camera sensor.

15 Claims, 13 Drawing Sheets

450

900

910    1/4 BLUE    1/4 RED

1/4 GREEN    1/4 TO BE ASSIGNED FOR ADDITIONAL GREEN OR IR

MONOCHROME META OPTICS CAMERA
SENSOR-SOLID COLOR FILTER EACH AREA

META-OPTICS CAMERA ASSEMBLY FOR USE WITH INFORMATION HANDLING SYSTEMS

BACKGROUND OF THE INVENTION

Field of the Invention

The present invention relates to information handling systems. More specifically, embodiments of the invention relate to a meta-optic camera assembly for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a camera, comprising: a meta-optics portion; a sensor; and, an interposer layer positioned between the meta-optics portion and the sensor portion, the interposer layer being parallelly aligned between the meta-optics portion and the camera sensor.

In another embodiment the invention relates to a lid housing portion of an information handling system, comprising: a display cover portion; a rear display cover portion coupled to the top cover portion; and, a camera mounted to the rear display cover portion, the camera comprising a meta-optics portion; a sensor; and, an interposer layer positioned between the meta-optics portion and the sensor portion, the interposer layer being parallelly aligned between the meta-optics portion and the camera sensor.

In another embodiment the invention relates to an information handling system comprising: a processor; a data bus coupled to the processor; an information handling system chassis housing, the housing comprising a base chassis; and, an information handling system display chassis, the information handing system display chassis comprising a camera, the camera comprising a meta-optics portion; a sensor; and, an interposer layer positioned between the meta-optics portion and the sensor portion, the interposer layer being parallelly aligned between the meta-optics portion and the camera sensor.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
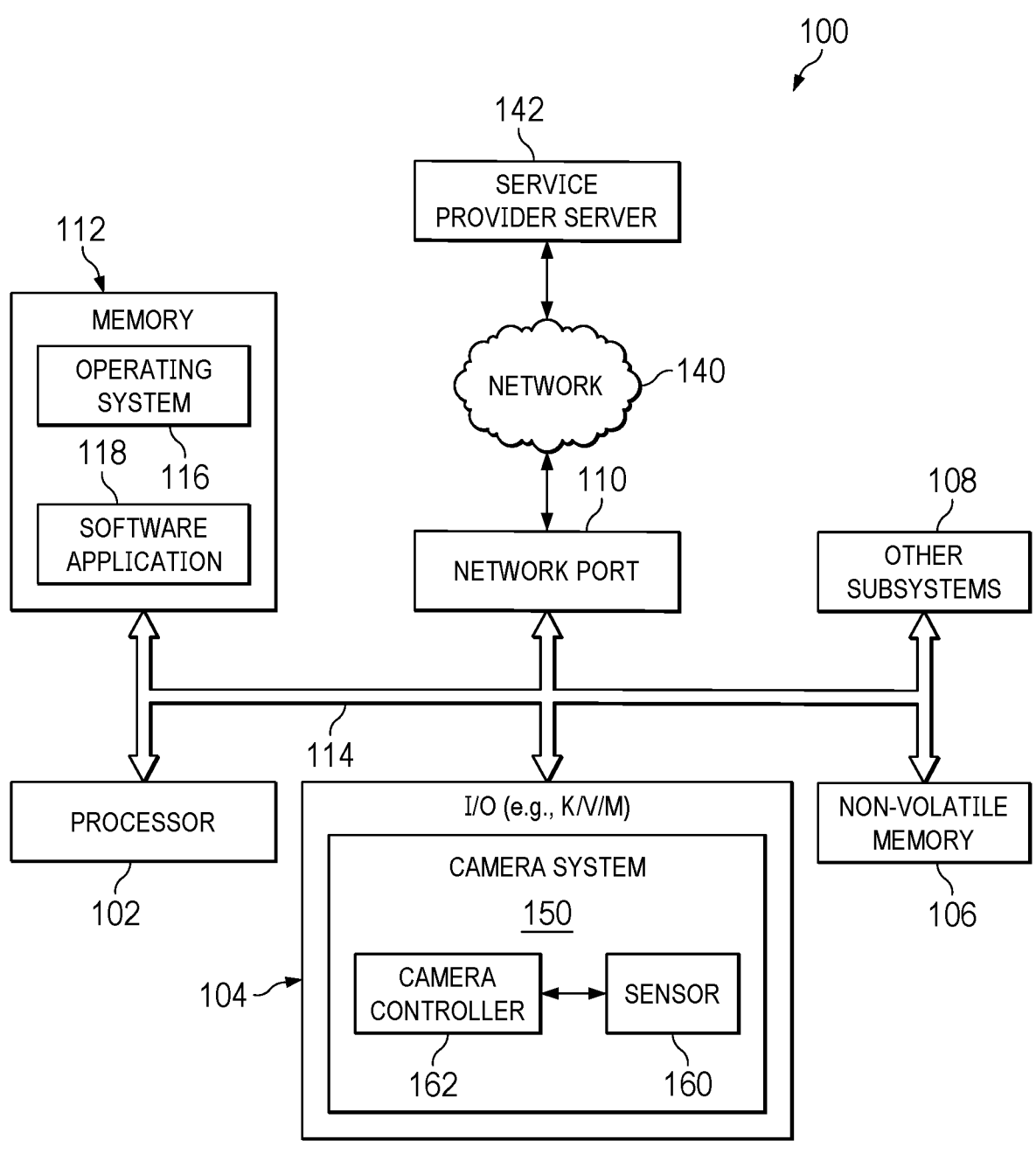
FIG. 1 shows a general illustration of components of an information handling system as implemented in the system and method of the present invention.

Various aspects of the present disclosure include an appreciation that with portable type information handling system, form factor limitations in the Z dimension are often driven by the display and camera thicknesses. Various aspects of the present disclosure include an appreciation that with portable type information handling system, displays are shifting to plastic OLED type display which can allow driving display thicknesses below 2 mm. Various aspects of the present disclosure include an appreciation that known refractive type cameras can be limited in thickness by the number of optical lenses used. Various aspects of the present disclosure include an appreciation that with known refractive type cameras the number of lenses is increasing with resolution. For example, for a simple high definition (HD) camera HD or full high definition (FHD) camera there is often a need for four to six lenses that are vertically stacked and then positioned at a distance away from the cameral sensor. The height of the combination of lenses is referred to as the total track length (TTL) of the stack. Camera packaging is then used to complete the assembly. Multiple optical elements and complex camera assembly and packaging leads to thickness limitation which is then imposed on the portable type information handling system. The optical elements and complex camera assembly can also lead to a relatively high cost for the camera. Various aspects of the present disclosure include an appreciation that it would be desirable to replace all the refractive optical lenses to reduce the total thickness and cost of the camera system.

Accordingly, in certain embodiments a camera system is disclosed to address these issues. In various embodiments, the camera system comprises a meta-optics camera system. In certain embodiments, the meta-optics camera system includes a camera sensor, a camera controller, or a combination thereof. In certain embodiments, the camera sensor includes a meta-optic lens. In certain embodiments, the meta-optic lens includes a patterned dielectric. In certain embodiments, the patterned dielectric is configures for phase delay. In certain embodiments, the phase delay is dependent on the composition and pattern of the dielectric pattern (e.g., the height (H) of the pattern, the width (W) of the pattern, material, or a combination thereof). In certain embodiments, the camera controller performs a reconstruction operation on the information gathered by the meta-optics lens. In certain embodiments, the meta-optics lens includes a plurality of pixel lens portions. In certain embodiments, each pixel lens portion may include a plurality of lens elements. In certain embodiments, each pixel lens portion includes four to six lens elements. In certain embodiments, the lens element provides a refractive function. As used herein, a refractive function broadly refers to a function of focusing or dispersing a light beam by redirection as it passes from one medium to another medium.

In certain embodiments, the camera system provides a larger depth of field "blur pattern" when compared with traditional refractive lens cameras. In certain embodiments, the camera system is more compact and lightweight when compared with traditional refractive lens cameras. In certain embodiments, the camera system is Less sensitive to packaging tolerances when compared with traditional refractive lens cameras. In certain embodiments, portions of the camera system may be fabricated using high volume semiconductor processing. In certain embodiments, the camera system is reduces total track length (TTL) when compared with traditional refractive lens cameras. In certain embodiments, the camera system includes a rectangular meta-optics lens which can be matched to dimensions of sensor, without the overhang from traditional round optics found in traditional refractive lens cameras. In certain embodiments, the image quality (IQ) of camera system IQ equal or better than traditional lens due to light transmission efficiency and uniformity. In certain embodiments, computational manipulation provided by the cameral controller provides better IQ and increased depth of field when compared with traditional refractive lens cameras.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142. In certain embodiments, the information handling system 100 includes a cameral system 150. In certain embodiments, the camera system 150 includes a camera sensor 160, a camera controller 162, or a combination thereof.

In certain embodiments the camera system 150 comprises a meta-optics camera system. In certain embodiments, the meta-optics camera system includes the camera sensor 160, the camera controller 162, or a combination thereof. In certain embodiments, the camera sensor 160 includes a meta-optic lens. As used herein, a meta-optics lens comprises planar surfaces having a plurality of sub-wavelength structures (referred to as nanopillars or simply pillars) to manipulate light. In various embodiments, meta surface responses can be tuned for one or more properties of light including phase, wavelength, amplitude and polarization. In certain embodiments, a meta-optics lens can combine a plurality of optical functions into a single element. The level of accuracy and control combined with multifunctional capability in a single surface results in a compact, optically stable module ideal for device miniaturization.

In certain embodiments, the meta-optic lens includes a patterned dielectric. In certain embodiments, the patterned dielectric is configured for phase delay. In certain embodiments, the phase delay is dependent on the composition and pattern of the dielectric pattern (e.g., the height (H) of the pattern, the width (W) of the pattern, material, or a combination thereof). In certain embodiments, the camera controller 162 performs a reconstruction operation on the information gathered by the components of the meta-optics lens. In certain embodiments, the meta-optics lens includes a plurality of pixel lens portions. In certain embodiments, each pixel lens portion may include a plurality of lens elements. In certain embodiments, each pixel lens portion includes four to six lens elements. In certain embodiments, the lens elements provide a refractive function.

Figure 2:
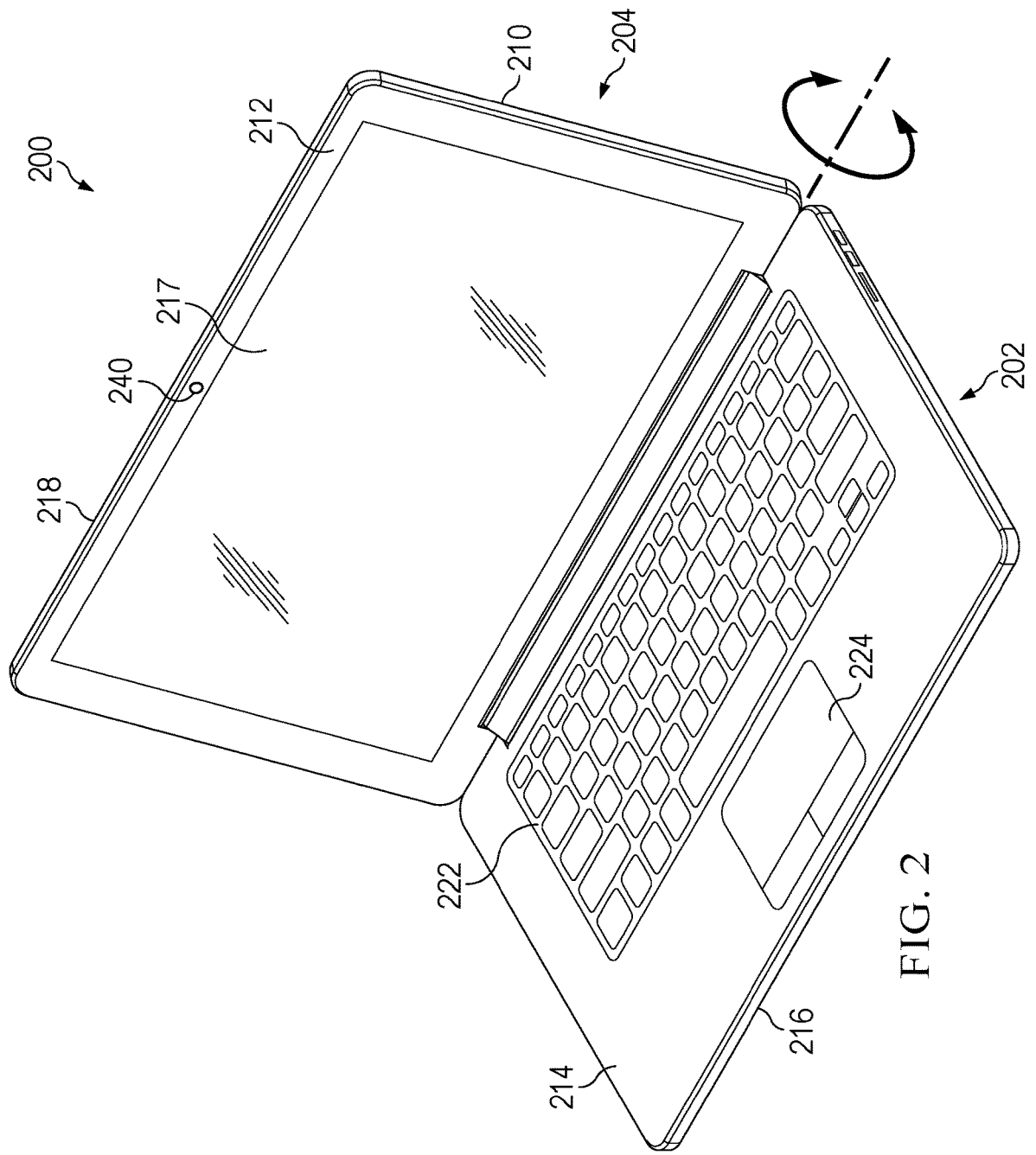
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 217 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 210 forms a top outer protective shell, or a portion of a lid, for the information handling system 200, while the D-cover 216 forms a bottom outer protective shell, or a portion of a base, for the information handling system. When in the fully closed configuration, the A-cover 210 and the D-cover 216 would be substantially parallel to one another.

In some embodiments, both the A-cover 210 and the D-cover 216 may be comprised entirely of metal. In some embodiments, the A-cover 210 and D-cover 216 may include both metallic and plastic components. For example, plastic components that are radio-frequency (RF) transparent may be used to form a portion of the C-cover 214.

In various embodiments, the display chassis 204 may be movably connected to a back edge of the base chassis 202 via one or more hinges. In this configuration, the hinges allow the display chassis 204 to rotate from and to the base chassis 202 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the display chassis 204 with regard to the base chassis 202, for example up to 180° rotation arc. In other embodiments the information handling system 200 may be a convertible information handling system with full rotation to a tablet configuration.

In various embodiments, the display chassis 204 defines an aperture 240 through which a camera system such as camera system 150 can receive image data. In certain embodiments, the aperture 240 corresponds to a baffle portion of a camera system.

Figure 3:
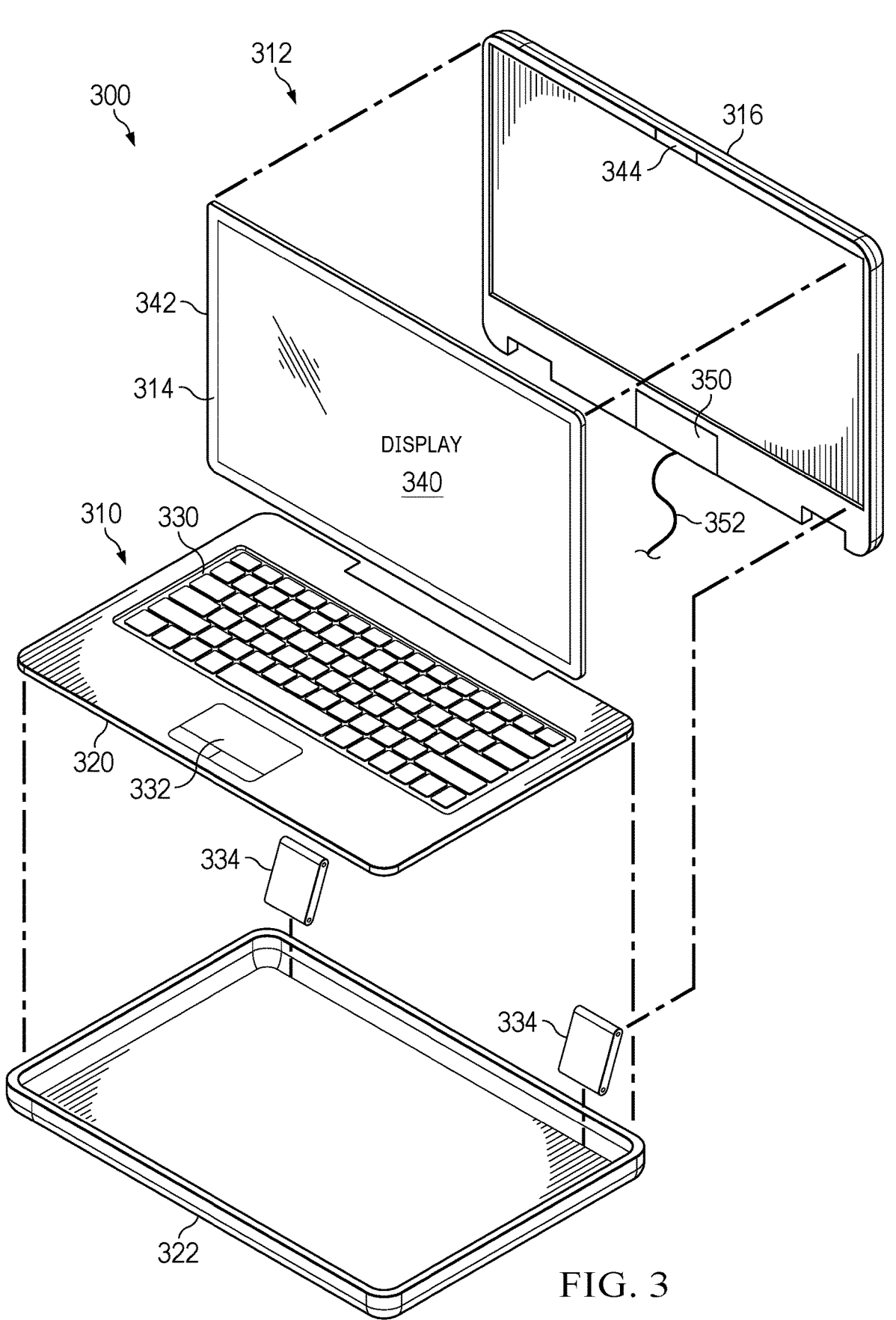
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 212) and a rear display cover portion 316 (which includes the A-Cover 210). The top cover portion 320 may include an integrated keyboard 330 or other I/O devices, such as a trackpad 332 or microphone (not shown). In various embodiments, the keyboard 330 may be mounted to the top of the C-Cover of the main housing portion 310. In various embodiments, the keyboard 330 may be mounted to the underside of the C-Cover of the main housing portion 310.

Lid housing portion 312 is rotationally coupled to main housing portion 310 via at least one hinge assembly 334. Lid housing portion 312 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 312 such that bezel may be narrow in size (e.g., less than 10 millimeters) on the edges. For example, display 340 is an infinity display with narrow bezels on the top and sides of lid housing portion 312 in the embodiment shown in FIG. 3. In certain embodiments, the side bezel is less than 4 mm (+/−10%) and the top bezel is less than 6 mm (+/−10%).

Lid housing portion 312 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 312 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

In certain embodiments, the read display cover portion 316 defines a recess into which a camera system 344 may be mounted. In certain embodiments, the camera system 344 corresponds to camera system 150. In certain embodiments, the camera system 344 comprises a meta-optics camera system.

Figure 4:
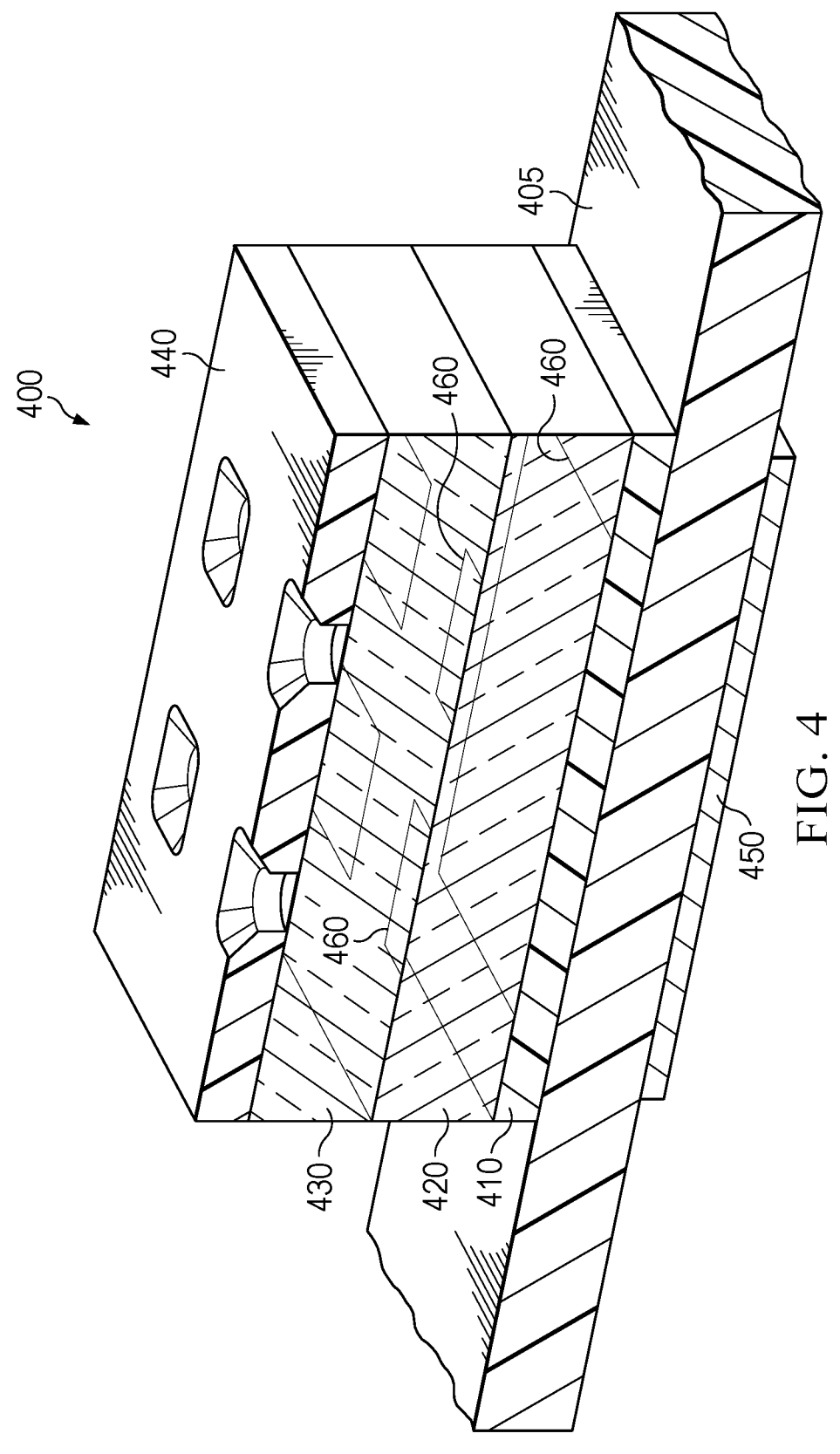
FIG. 4 shows a cut away perspective view of a camera in accordance with the present disclosure.
Figure 5A:
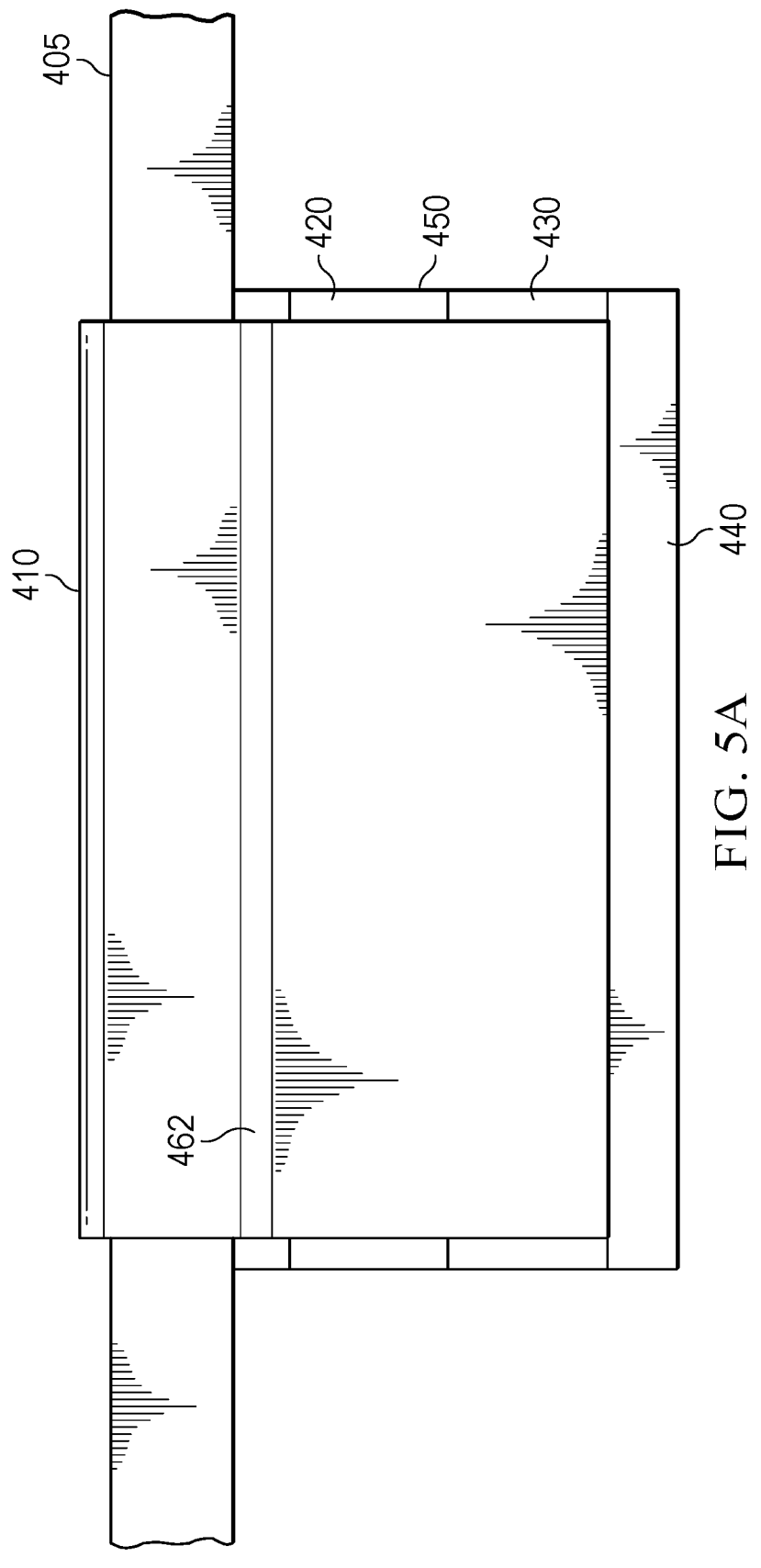
FIGS. 5A, 5B, 5C and 5D, generally referred to as FIG. 5, respectively show top, front, rear and side views of a camera in accordance with the present disclosure.
Figure 5B:
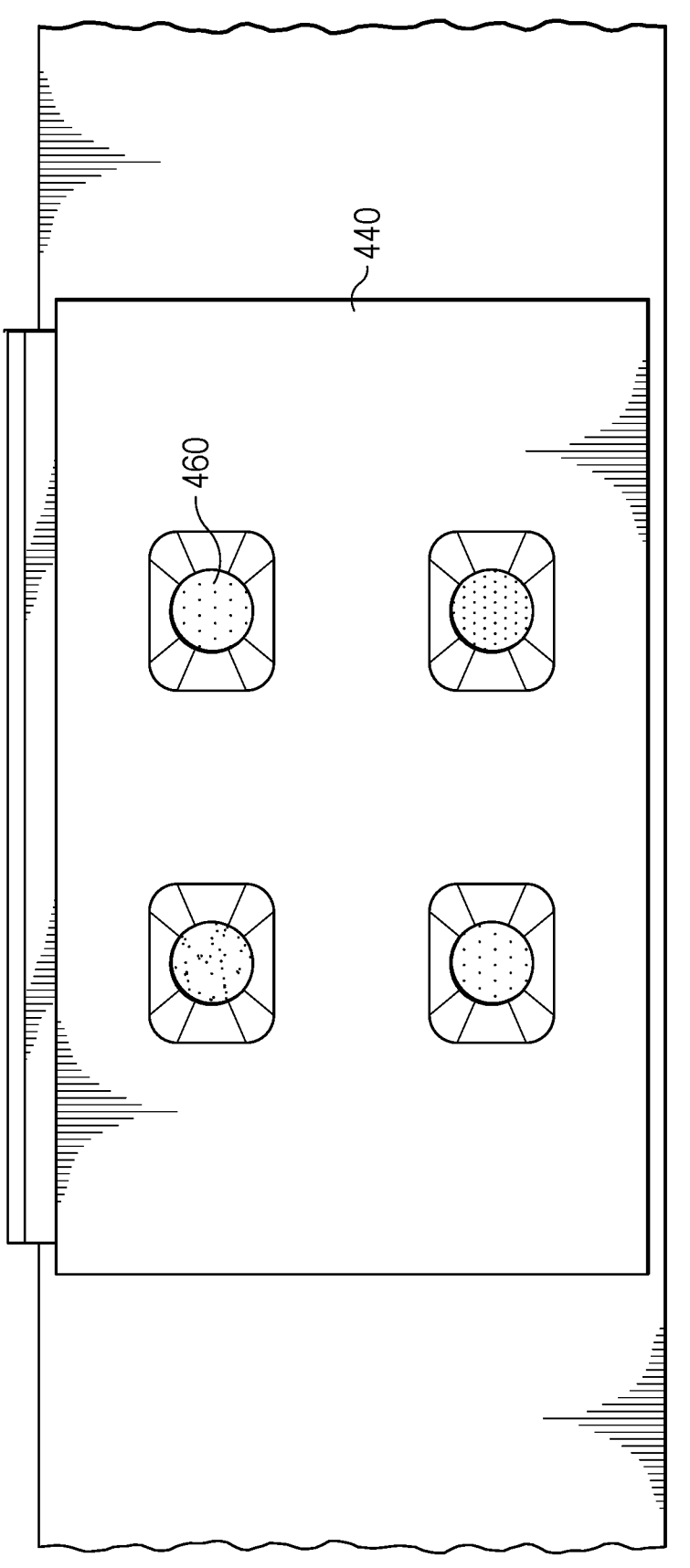
Figure 5C:
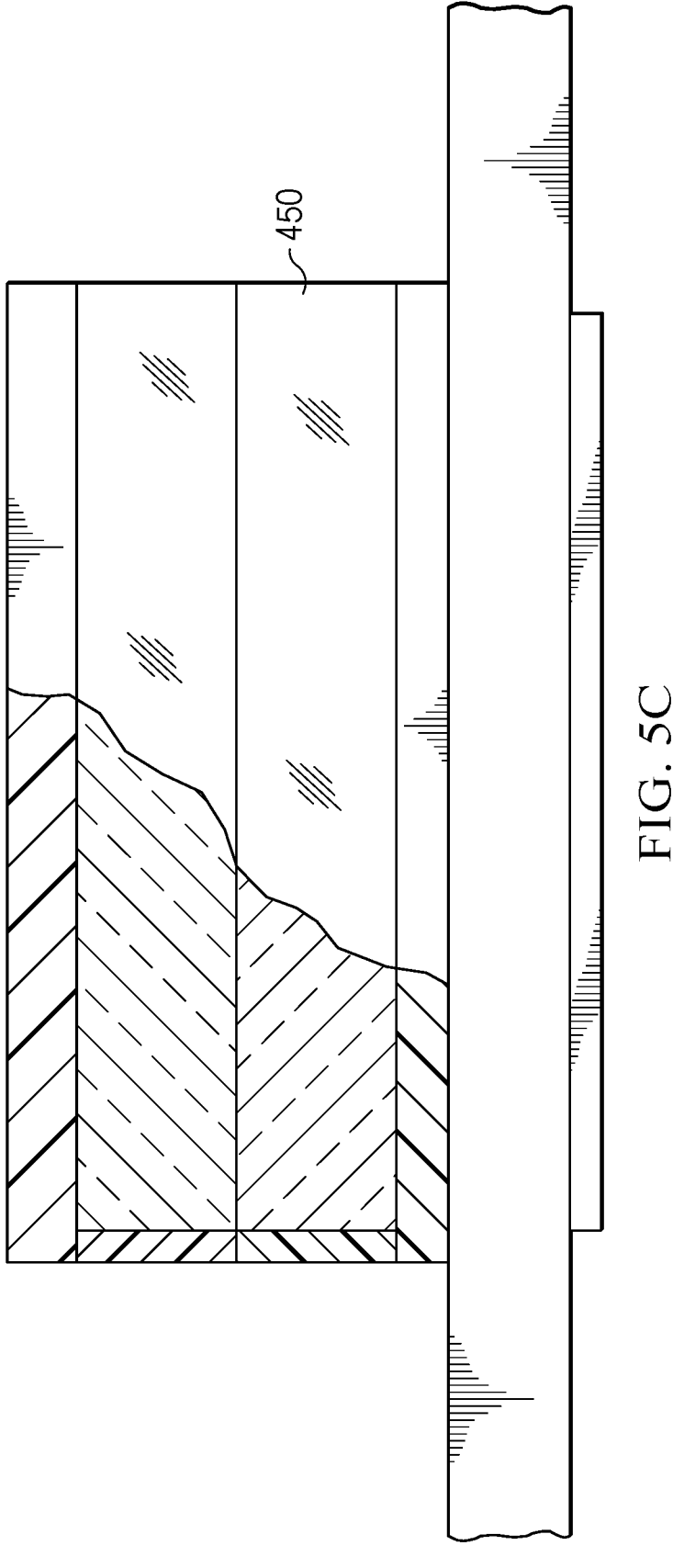
Figure 5D:
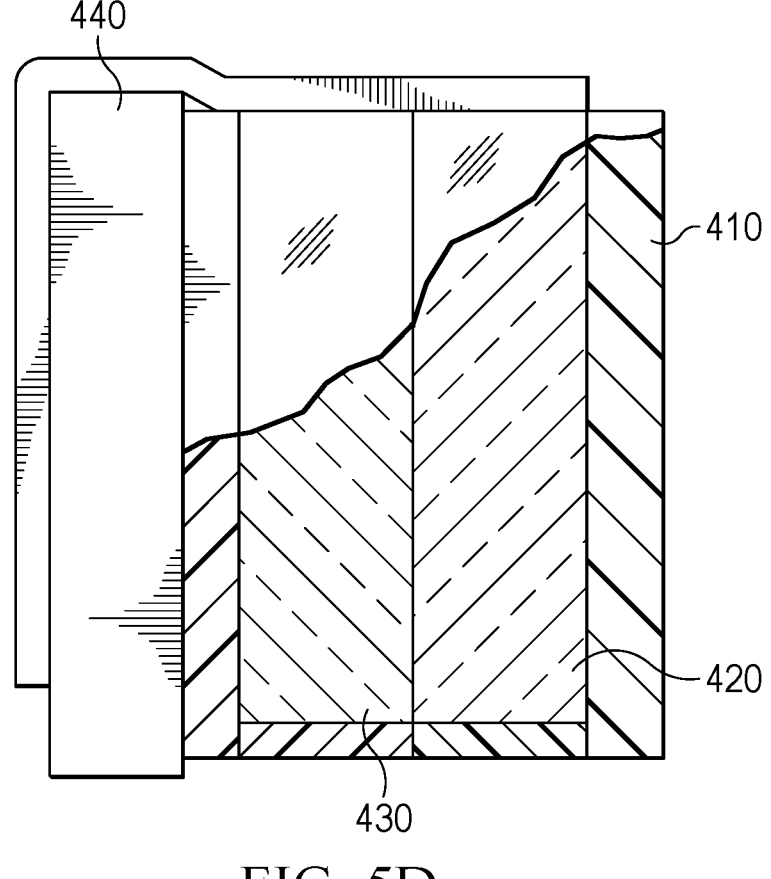
Figure 6:
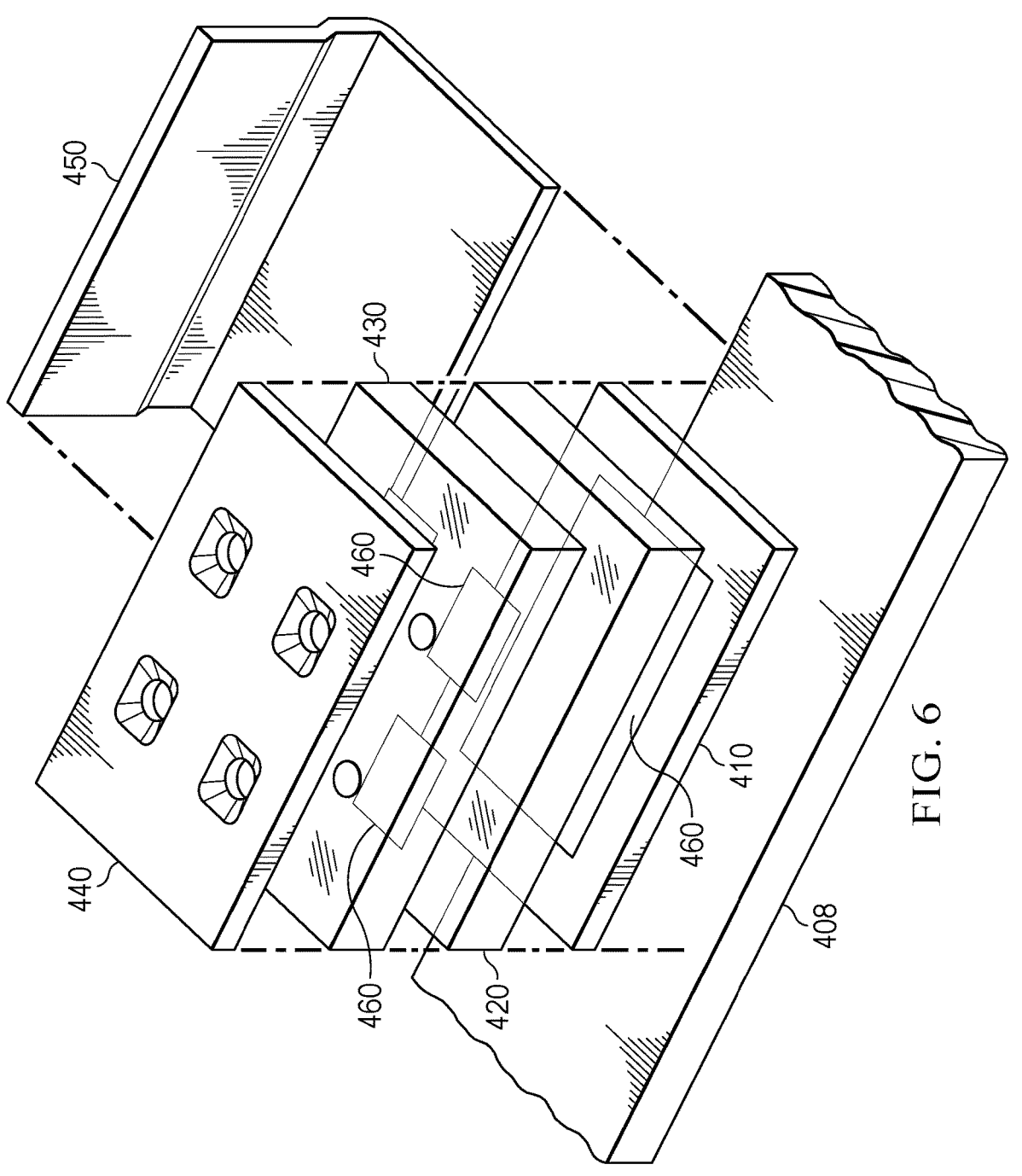
FIG. 6 shows an exploded view of a camera in accordance with the present disclosure.

FIG. 4 shows a cut away perspective view of a camera 400 and a printed circuit board 405. FIGS. 5A, 5B, 5C and 5d, generally referred to as FIG. 5, respectively show top, front, rear and side views of the camera 400. FIG. 6 shows an exploded view of the camera 400. In various embodiments, the camera 400 corresponds to some or all of camera system 150.

In certain embodiments the camera 400 comprises some or all of a meta-optics camera system. In certain embodiments, the meta-optics camera 400 includes a camera component which interacts with a camera controller. In certain embodiments, the cameral controller is contained within electronics mounted to a printed circuit board 405. In certain embodiments, the camera component includes a meta-optic lens. In certain embodiments, the meta-optic lens includes a patterned dielectric. In certain embodiments, the patterned dielectric is configured for phase delay. In certain embodiments, the phase delay is dependent on the composition and pattern of the dielectric pattern (e.g., the height (H) of the pattern, the width (W) of the pattern, material, or a combination thereof). In certain embodiments, the camera controller performs a reconstruction operation on the information gathered by the meta-optics lens. In certain embodiments, the meta-optics lens includes a plurality of pixel lens portions. In certain embodiments, each pixel lens portion may include a plurality of lens elements. In certain embodiments, each pixel lens portion includes four to six lens elements. In certain embodiments, each pixel lens portion provides a refractive function.

In certain embodiments, the camera 400 includes a sensor 410, an interposer layer 420, a meta-optics portion 430, a baffle portion 440, a conductive foil portion 450, or a combination thereof. In various embodiments, color filters 460 are located on the meta-optics portion 430, on a base 462 of the camera mounted the printed circuit board 405 to which a surface of the sensor 410 is mounted, or a combination thereof.

In certain embodiments, the interposer layer 420 is designed to parallelly aligned between the meta-optics portion 430 with to camera sensor 410. In certain embodiments, the interposer layer 420 causes light propagation to be uniformity distributed across the sensor 410 without scatter or focus errors. In certain embodiments, the interposer layer 420 is constructed of an interposer material with an index of refraction near (i.e., +/−15%) air or near (i.e., +/−15%) the pillar material of the meta-optics portion depending on filler used in between the pillars.

In certain embodiments, the interposer layer 420 ensures coplanarity of the opposing surfaces of the meta-optics portion 430 and the sensor 410. In certain embodiments, the interposer layer 420 is constructed of a material that can be locked in using UV or other assembly processes. In certain embodiments, the interposer layer 420 provides camera assembly rigidity.

In certain embodiments, the interposer layer 420 can be configured to include integrated color filters in designated areas. In certain embodiments, the integrated color filters allow light of certain monochrome wavelengths passthrough from the meta-optics portion 430 to the sensor 410. In certain embodiments, the interposer layer 420 is constructed from a visual or infrared (IR) wavelength transparent interposer. In certain embodiments, regions of the interposer layer 420 are constructed from different visual or IR wavelength transparent portions to allow different regions of the interposer layer 420 to provide different functionality. In certain embodiments, the interposer layer 420 defines apertures in selected regions to allow for different functionality such as unrestricted wavelengths passing through or for assembly functionality. Such an interposer layer 420 advantageously enables a thin Z dimension camera using few assembly steps resulting in a lower total camera cost.

In certain embodiments, the baffle portion 440 is positioned above the meta-optics layer 430. In certain embodiments, the baffle portion 440 defines a plurality of apertures 460. In various embodiments, the plurality of apertures providing light transmission paths to the meta-optics portion 430. In certain embodiments, the plurality of apertures correspond to various light transmission portions. In certain embodiments, the apertures 460 include a blue color aperture, a red color aperture, a green color aperture and an unassigned aperture. In certain embodiments, the unassigned aperture may comprise another green color aperture. In certain embodiments, the unassigned aperture may comprise a monochrome aperture. In certain embodiments, the unassigned aperture may comprise an infrared (IR) aperture. In certain embodiments, each aperture color filter quarter corresponds to a color filter quarter of an interposer layer 420.

In certain embodiments, the conductive foil portion 450 includes an opaque conductive coating applied to the exterior of the camera stack up to prevent external light from entering the cameral module and to prevent electromagnetic interference (EMI) with the information handling system in which the camera is mounted.

Figure 7:
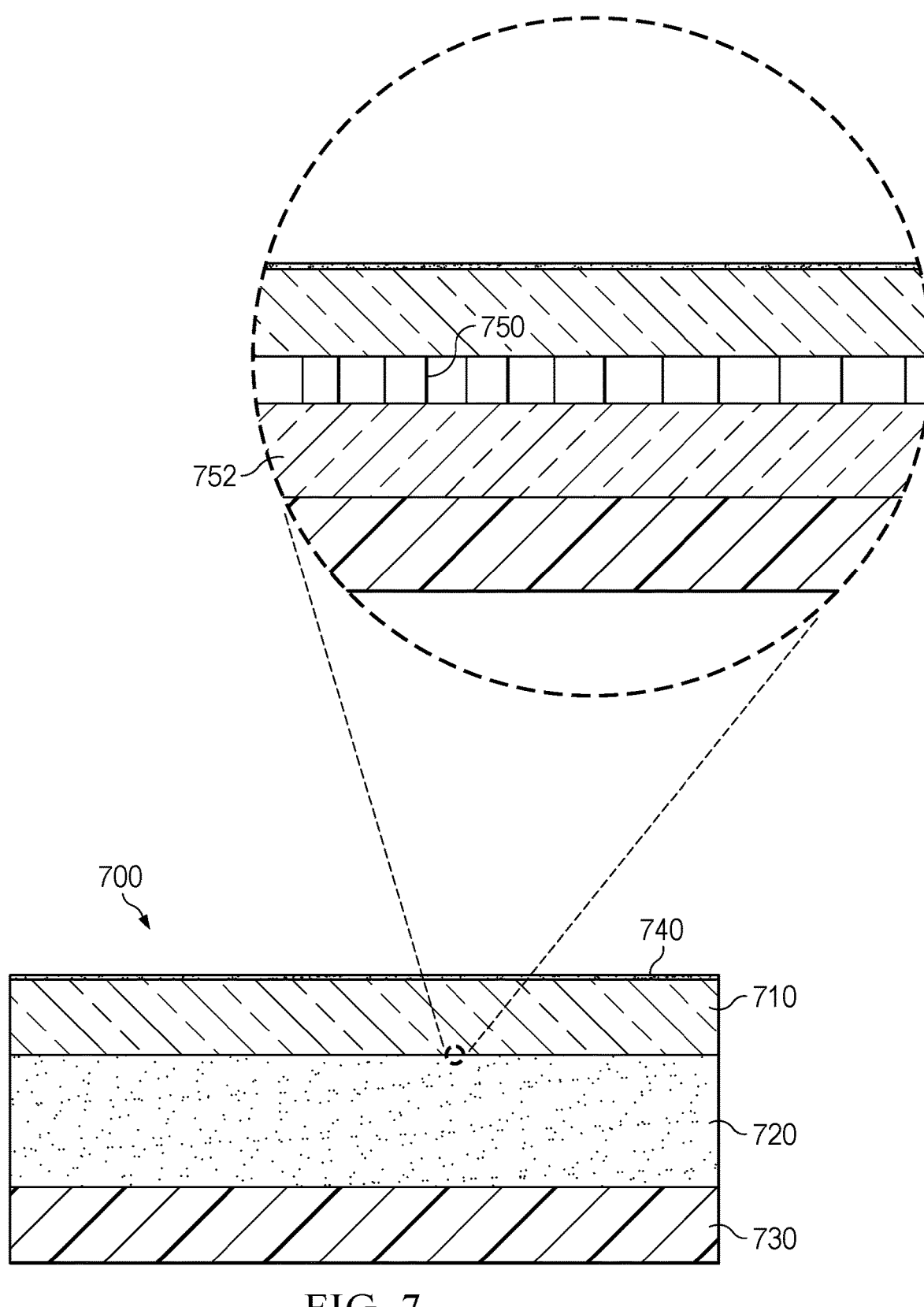
FIG. 7 shows a portion of a cut away side view of a camera in accordance with the present disclosure.

FIG. 7 shows a portion of a cut away side view of portion a camera 700 in accordance with the present disclosure. In certain embodiments, the camera 700 corresponds to some of all of camera system 150. In certain embodiments, the camera 700 includes a meta-optics layer 710, an interposer layer 720, a sensor layer 730, or a combination thereof. In certain embodiments, the meta-optics layer 710 is coated with an anti-reflective treatment 740. In certain embodiments, the meta-optics layer 710 includes a plurality of meta-optics pillars 750. In certain embodiments, the plurality of meta-optics pillars 750 are patterned on an optic film and mounted to a meta-optics substrate 752. In certain embodiments, the interposer layer 720 includes geometric surface patterning. In certain embodiments, the interposer layer 720 is constructed of a material such that the interposer layer 720 conforms to optical and mechanical properties of the camera 700.

In certain embodiments, the meta lens uses the pillars 750 to enable light phase delay. The height and spacing between the pillars enable the delay. For example, a narrow pillar spacing provides less delay and wider pillar spacing provides a longer delay. In certain embodiments, the pillars are composed of Silver Nitride. In certain embodiments, the pillars provide an indices of refraction of substantially (e.g., +/−20%) 2.1 RI. In certain embodiments, the air around the pillar provides an indices of refraction of substantially (e.g., +/−20%) 1.05 RI. Accordingly, in the meta lens light takes approximately twice the time to travel through the air vs. the pillar material.

In certain embodiments, an optical interposer is located between the pillars and the optical sensor. In certain embodiments, an optical adhesive is used which has an indices of refraction near the pillar indices of refraction or in between the air indices of refraction and the pillar indices of refraction. In certain embodiments, the optical adhesive is ultra violet (UV) hardened to lock the components of the camera in place.

In certain embodiments, a liquid adhesive that can be dispensed between the pillars and optical sensor is used to fill the spacing in between the pillars. In these embodiments, the adhesive indices of refraction is substantially 1.37 (i.e., closer to the indices of refraction for air. In certain embodiments, the adhesive is adjusted to ensure coplanarity and is then locked in place via UV hardening. In either cases ray tracing simulation is used to optimize the pillars geometry, indices of refractions of all materials, and desirable camera design form factor.

Figure 8:
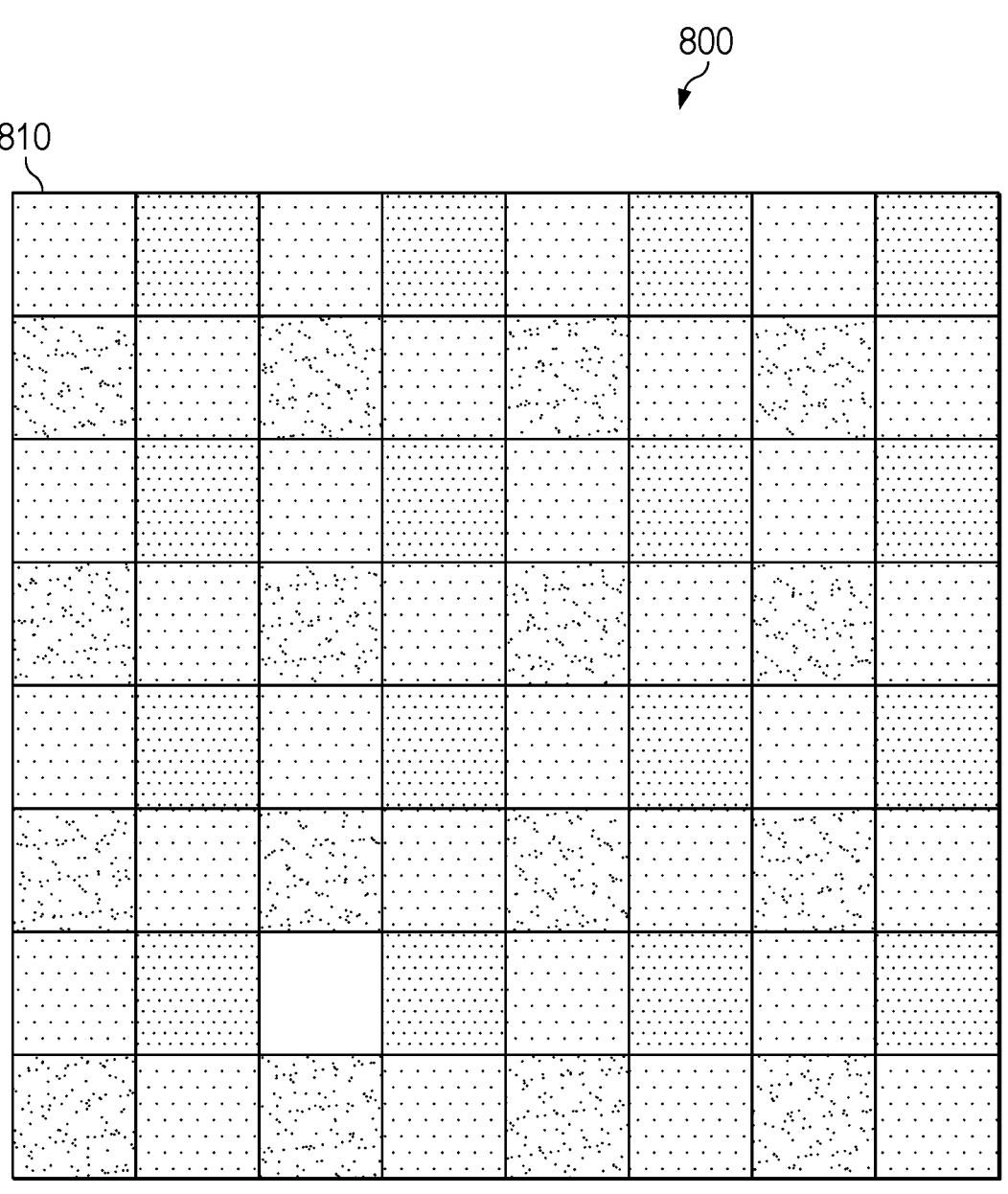
FIG. 8 shows an example camera sensor layout in accordance with the present disclosure.

FIG. 8 shows an example camera sensor layout in accordance with the present disclosure. In certain embodiments, the meta-optics camera sensor 800 corresponds to sensor 410. In certain embodiments, the meta-optics camara sensor 800 is configured as a Bayer camera sensor. In certain embodiments, the meta-optics camera sensor 800 comprises a mosaic of sensor elements 810. In certain embodiments, the mosaic of sensor elements comprises an arrangement of RGB color filters on a square grid of photosensors. In certain embodiments, the meta-optics camera sensor 800 includes two green color filters for every one red and blue color filter.

Figure 9:
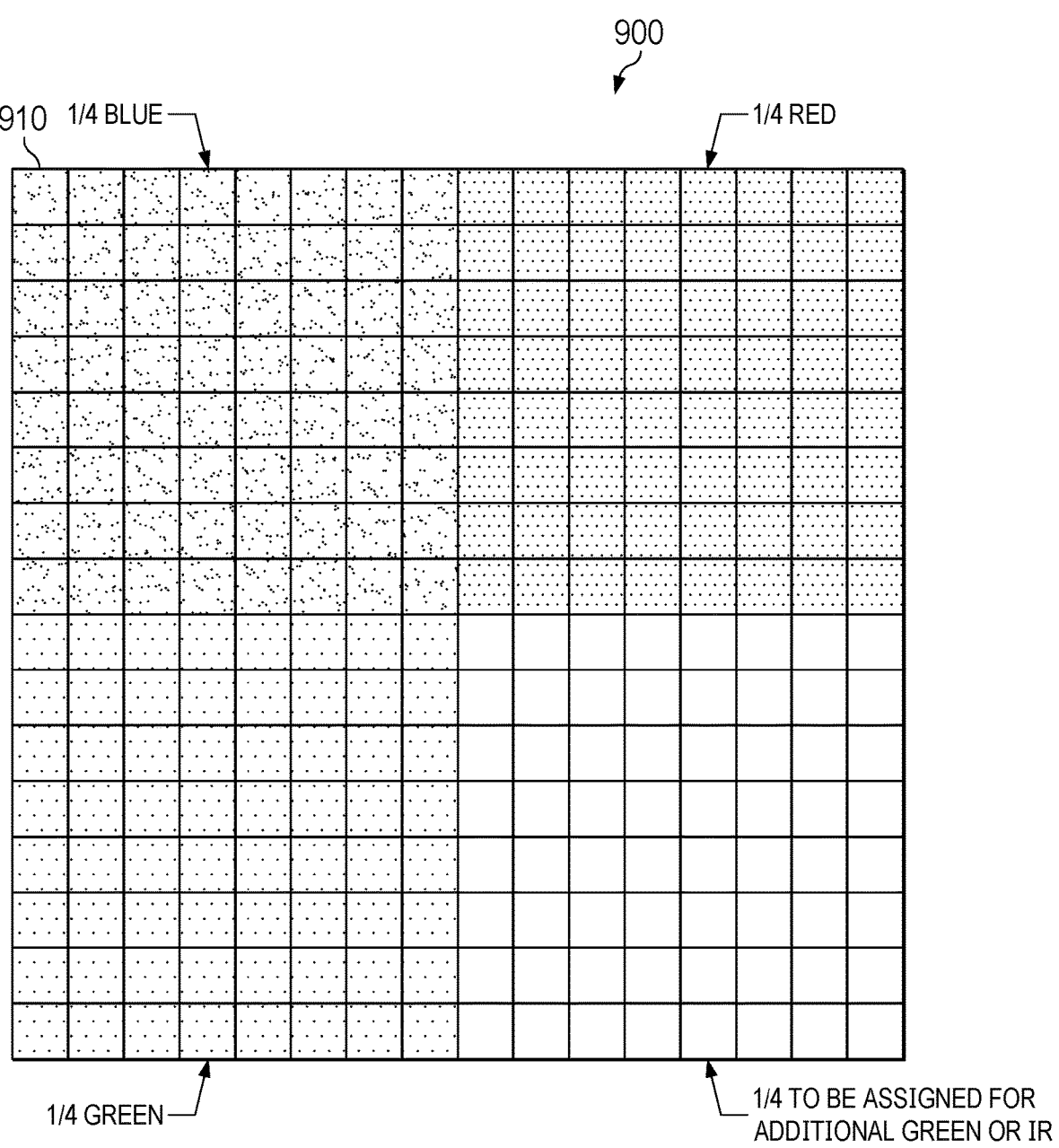
FIG. 9 shows an example of a portion of a meta-optics camera sensor in accordance with the present disclosure.

FIG. 9 shows an example of a portion of a meta-optics camera sensor 900 in accordance with the present disclosure. In certain embodiments, the meta-optics camera sensor 900 corresponds to sensor 410. In certain embodiments, the meta-optics camera sensor 900 comprises a mosaic of sensor elements 910. In certain embodiments, the meta-optics camara sensor 900 is divided into quarters. In certain embodiments, the mosaic of sensor elements comprises an arrangement of color filters corresponding to the quarters of the meta-optics camera sensor 900. In certain embodiments, the quarters include a blue color filter quarter, a red color filter quarter, a green color filter quarter and an unassigned color filter quarter. In certain embodiments, the unassigned color filter quarter may comprise another green color filter quarter. In certain embodiments, the unassigned color filter quarter may comprise a monochrome color filter quarter. In certain embodiments, the unassigned color filter quarter may comprise an infrared (IR) color filter quarter. In certain embodiments, each color filter quarter corresponds to an aperture of a baffle layer (such as baffle layer 440) of a camera system such as camera system 150.

Figures 10A, 10B, 10C:
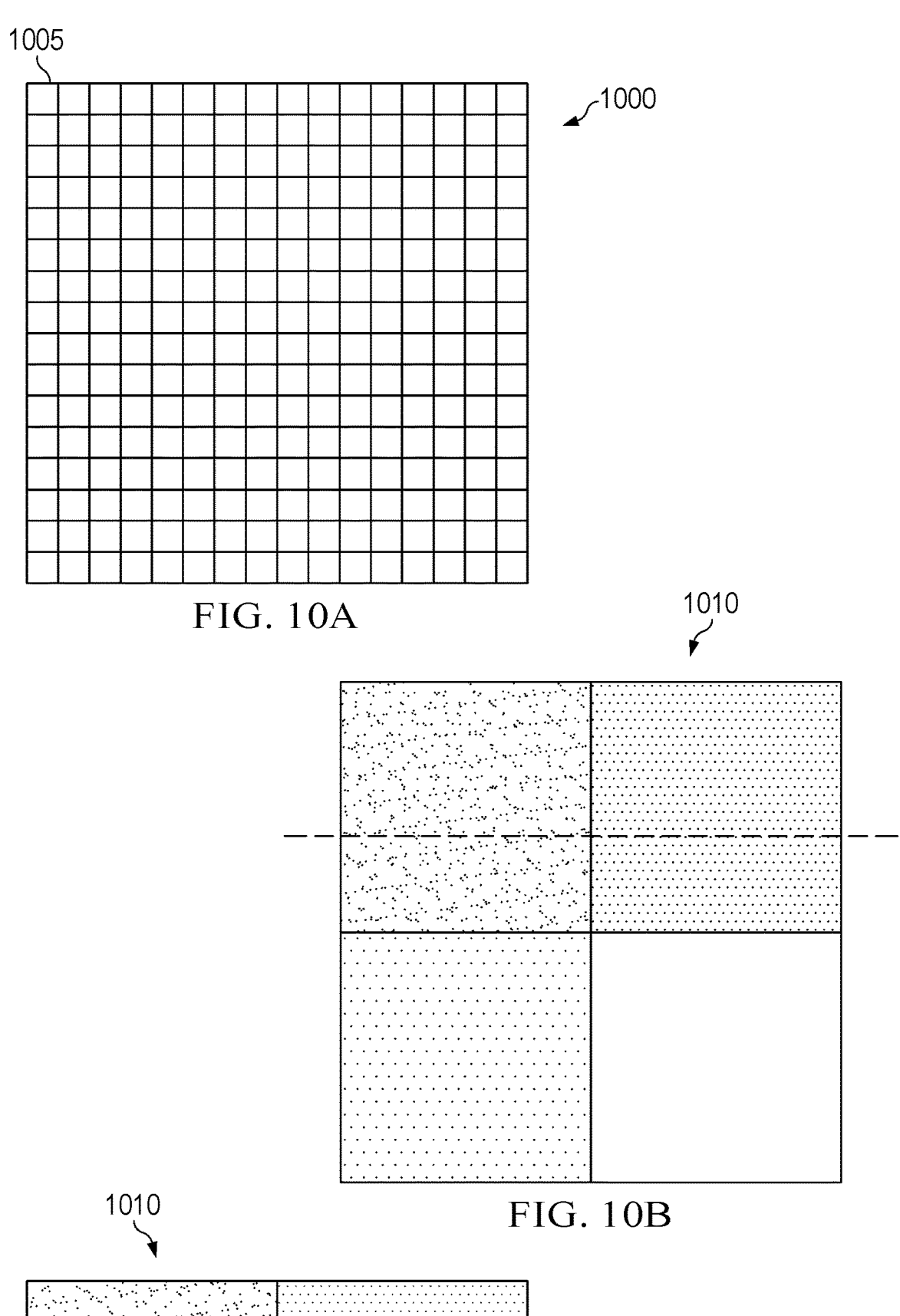
FIGS. 10A, 10B and 10C, generally referred to as FIG. 10, show an example monochrome meta-optics camera sensor, a top view of a portion of an example interposer filter and a side view of an example interposer filter in accordance with the present disclosure.

FIGS. 10A, 10B and 10C, generally referred to as FIG. 10, show an example meta-optics monochrome meta-optics camera sensor 1000, a top view of a portion of an example interposer layer 1010 and a side view of an example interposer layer 1010 in accordance with the present disclosure. In certain embodiments, the meta-optics camera sensor 1000 corresponds to sensor 410. In certain embodiments, the meta-optics camera sensor 1000 comprises a mosaic of monochromatic sensor elements 1005. In certain embodiments, the interposer layer 1010 comprises a monochromatic filter layer positioned in front of the meta-optics camera sensor 1000. In certain embodiments, the monochromatic filter layer of the interposer layer 1010 comprises an arrangement of color filters corresponding to the quarters of the meta-optics camera sensor 1000. In certain embodiments, the quarters include a blue color filter quarter, a red color filter quarter, a green color filter quarter and an unassigned color filter quarter. In certain embodiments, the unassigned color filter quarter may comprise another green color filter quarter. In certain embodiments, the unassigned color filter quarter may comprise a monochrome color filter quarter. In certain embodiments, the unassigned color filter quarter may comprise an infrared (IR) color filter quarter.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A camera, comprising:
a meta-optics portion;
a sensor;
an interposer layer positioned between the meta-optics portion and the sensor portion, the interposer layer being parallelly aligned between the meta-optics portion and the camera sensor; and,
a conductive foil portion, the conductive foil portion being positioned on an exterior of the camera, the conductive foil portion preventing external light from entering the camera.

2. The camera of claim 1, further comprising:
a baffle portion positioned above the meta-optics portion.

3. The camera of claim 2, wherein:
the baffle portion defines a plurality of baffle apertures, the baffle apertures providing light transmission portions to the meta-optics portion.

4. The camera of claim 1, wherein:
the interposer layer causes light propagation to be uniformly distributed across the sensor.

5. The camera of claim 1, wherein:
the interposer layer is constructed of an interposer material with an index of refraction near air or near the pillar material of the meta-optics portion.

6. A lid housing portion of an information handling system, comprising:
a display cover portion;
a rear display cover portion coupled to the top cover portion; and,
a camera mounted to the rear display cover portion, the camera comprising
a meta-optics portion;
a sensor;
an interposer layer positioned between the meta-optics portion and the sensor portion, the interposer layer being parallelly aligned between the meta-optics portion and the camera sensor; and, a conductive foil portion, the conductive foil portion being positioned on an exterior of the camera, the conductive foil portion preventing external light from entering the camera.

7. The lid housing portion of claim 6, where the camera further comprises:

a baffle portion positioned above the meta-optics portion.

8. The lid housing portion of claim 7, wherein:

the baffle portion defines a plurality of baffle apertures, the baffle apertures providing light transmission portions to the meta-optics portion.

9. The lid housing portion of claim 6, wherein:

the interposer layer causes light propagation to be uniformly distributed across the sensor.

10. The lid housing portion of claim 6, wherein:

the interposer layer is constructed of an interposer material with an index of refraction near air or near the pillar material of the meta-optics portion.

11. An information handling system comprising:

a processor;

a data bus coupled to the processor;

an information handling system chassis housing, the housing comprising a base chassis, the base chassis housing the processor; and, an information handling system display chassis, the information handing system display chassis comprising a camera, the camera comprising a meta-optics portion;

a sensor;

an interposer layer positioned between the meta-optics portion and the sensor portion, the interposer layer being parallelly aligned between the meta-optics portion and the camera sensor; and, a conductive foil portion, the conductive foil portion being positioned on an exterior of the camera, the conductive foil portion preventing external light from entering the camera.

12. The information handling system of claim 11, the camera further comprises:

a baffle portion positioned above the meta-optics portion.

13. The information handling system of claim 12, wherein:

the baffle portion defines a plurality of baffle apertures, the baffle apertures providing light transmission portions to the meta-optics portion.

14. The information handling system of claim 11, wherein:

the interposer layer causes light propagation to be uniformly distributed across the sensor.

15. The information handling system of claim 11, wherein:

the interposer layer is constructed of an interposer material with an index of refraction near air or near the pillar material of the meta-optics portion.

\* \* \* \* \*